United States Patent

Metz

[15] 3,675,234

[45] July 4, 1972

[54] DIGITAL-TO-SYNCHRO/RESOLVER CONVERTER

[72] Inventor: Louis C. Metz, St. Paul, Minn.

[73] Assignee: Sperry Rand Corporation, New York, N.Y.

[22] Filed: Feb. 11, 1971

[21] Appl. No.: 114,444

[52] U.S. Cl. ....................340/347 DA, 340/347 SY

[51] Int. Cl. ....................H03k 13/04

[58] Field of Search ....................340/347 SY, 347 DA; 328/27; 318/573, 605

[56] References Cited

UNITED STATES PATENTS

| | | | |
|---|---|---|---|
| 3,471,851 | 10/1969 | MacTaggart | 340/347 DA |
| 3,576,561 | 4/1971 | Dureau | 340/347 DA |
| 3,579,229 | 5/1971 | Tripp | 340/347 DA |

*Primary Examiner*—Thomas A. Robinson
*Attorney*—Donald W. Phillion, Thomas J. Nikolai, Kenneth T. Grace and John P. Dority

[57] ABSTRACT

A digital-data to shaft-angle converter that compensates for the non-linear relationship between a 12-bit data word $\theta_{12}$, representing the desired shaft angle, and its corresponding trigonometric sine and cosine functions as represented by analog voltages. Basically the invention constructs, by empirical means and using linear voltage signals, first and second voltage segments whose amplitudes closely approximate sine and cosine functions, respectively, over the 0° - 45° range. The invention is also capable of constructing by empirical means, third and fourth signals which are mirror images of the first and second signals described above. By proper selection of two of the four possible signals described above and assigning a proper polarity thereto, all in accordance with a truth table, sine and cosine analog voltage signals are generated which can be employed to drive the synchro shaft to any desired angle angular position from 0° to 360°. Both the generation of the 0 – 45 sine and cosine voltage segments (and their mirror images) and the selecting of the proper ones of such generated voltage segments are effected by logic which is directly under the control of the data word $\theta_{12}$.

9 Claims, 8 Drawing Figures

INVENTOR
LOUIS C. METZ
BY Donald W. Phillion
ATTORNEY

| | | CONDITIONS TO FORM FACTOR SF | | | CONDITIONS TO FORM FACTOR A | | | CONDITIONS TO FORM FACTOR B | | |
|---|---|---|---|---|---|---|---|---|---|---|
| COL. 1 | COL. 2 | COL. 3 | COL. 4 | COL. 5 | COL. 6 | COL. 7 | COL. 8 | COL. 9 | COL. 10 | COL. 11 |
| $\theta_9$ BITS $\gamma_8$ AND $\gamma_7$ | ANGULAR RANGE: $\theta$ = | SHUNT GATE 1 | SHUNT GATE 2 | RESULTING VALUES OF SF | SHUNT GATE 3 | SHUNT GATE 4 | RESULTING VALUES OF A | ANALOG SWITCH 1 | ANALOG SWITCH 2 | RESULTING VALUE OF B |
| | VALUES ARE SHOWN FOR ODD NUMBERED OCTANTS ONLY. IN EVEN NUMBERED VALUES ARE HIGHER BY .083° | ON = R2 CONNECTED TO GND. OFF = R2 OPEN CIRCUITED | ON = R3 CONNECTED TO GND. OFF = R3 OPEN CIRCUITED | | ON = R5 CONNECTED TO GND. OFF = R5 OPEN CIRCUITED | ON = R6 CONNECTED TO GND. OFF = R6 OPEN CIRCUITED | | ON = R10 CONNECTED TO E1 OFF = R10 CONNECTED TO GND. | ON = R11 CONNECTED TO E1 OFF = R11 CONNECTED TO GND. | |
| 0 0<br>0 1 | 0° – 22.412° | ON | ON | 1.01 | OFF | OFF | 0.76536 | OFF | OFF | 0.19893 |
| 1 0 | 22.5° – 33.162° | OFF | ON | 1.03 | ON | OFF | 0.72899 | ON | OFF | 0.32930 |
| 1 1 | 33.75° – 44.912° | OFF | OFF | 1.08 | ON | ON | 0.66898 | ON | ON | 0.49336 |

Fig. 4

| COL. 1 | COL. 2 | COL. 3 | COL. 4 | COL. 5 | COL. 6 | COL. 7 |
|---|---|---|---|---|---|---|
| BITS | OCTANT | ANGULAR RANGE * (INCLUSIVE) | COMPLEMENT LOGIC $\Theta_9$ COMPLEMENTED? $\Theta_9 = \emptyset_8 - \emptyset_0$ | BIT $O_2$ | ANALOG SIGNAL SEL. | |
| $\emptyset_{11}$ $\emptyset_{10}$ $\emptyset_9$ | # | | | | SINE OUTPUT | COSINE OUTPUT |
| 0 0 0 | 1 | 0°– 44.912° | NO $\Theta_9$ COUNTS UP | 0 | +E1 (+E40) | +E2 (+E41) |
| 0 0 1 | 2 | 45°– 89.912° | YES $\Theta_9$ COUNTS DN | 1 | +E2 (+E42) | +E1 (+E43) |
| 0 1 0 | 3 | 90°– 134.912° | NO $\Theta_9$ COUNTS UP | 0 | +E2 (+E41) | -E1 (-E40) |
| 0 1 1 | 4 | 135°– 179.912° | YES $\Theta_9$ COUNTS DN | 1 | +E1 (+E43) | -E2 (-E42) |
| 1 0 0 | 5 | 180°– 224.912° | NO $\Theta_9$ COUNTS UP | 0 | -E1 (-E40) | -E2 (-E41) |
| 1 0 1 | 6 | 225°– 269.912° | YES $\Theta_9$ COUNTS DN | 1 | -E2 (-E42) | -E1 (-E43) |
| 1 1 0 | 7 | 270°– 314.912° | NO $\Theta_9$ COUNTS UP | 0 | -E2 (-E41) | +E1 (+E40) |
| 1 1 1 | 8 | 315°– 359.912° | YES $\Theta_9$ COUNTS DN | 1 | -E1 (-E43) | +E2 (+E42) |

* BASED ON BIT O ≅ 0.088°

Fig. 5

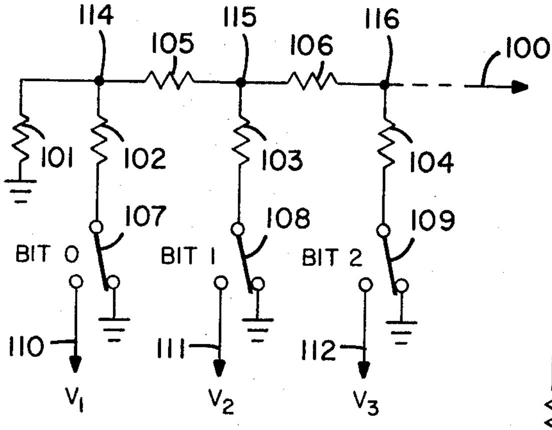

Fig. 6

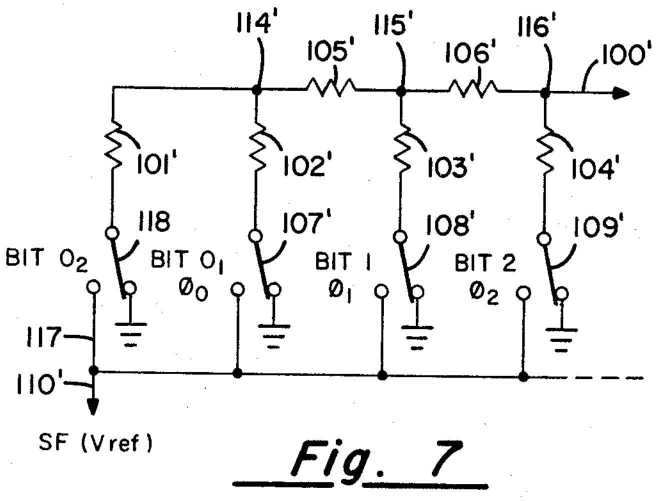

Fig. 7

DIGITAL-TO-SYNCHRO/RESOLVER CONVERTER

BACKGROUND OF THE INVENTION

The present invention relates to digital-to-analog converter systems and more particularly to such systems that convert a known multi-bit digital word into two analog voltage signals that constitute the sine and cosine voltage signals needed to drive the synchro shaft to a desired angular location defined by said digital word. For general background regarding this type of structure reference is made to an article entitled "A Digital-To-Synchro Converter" by R. E. Rasche, Sperry Engineering Review, Summer 1964, Pages 31 to 38. Further, the converter of the present invention includes an R, 2R ladder resistor network for linear conversion of a digital word to an analog voltage. While a general description of such ladder network is set forth herein, for a detailed discussion thereof, reference is made to a publication entitled "Analog-Digital Conversion Techniques" by A. K. Sussking, published by John Wiley & Sons, Inc. 1960, Pages 5–29.

SUMMARY OF THE INVENTION

A 12-bit data word $\theta_{12}$ is provided to a data register from an external source and represents the angular position in which the synchro shaft is to be positioned. Such angular position can be any position over a complete 360° range. The first nine bits of $\theta_{12}$ (herein called word $\theta_9$) recycle each 45° and represents the angular displacement within each octant of the full 360° range. A first logic means is responsive to a reference voltage and to the count of $\theta_9$ during each odd octant to empirically produce a first output voltage signal whose amplitude varies approximately as the sine of $\theta_9$ over the 0° – 45° range. By employing the complement of $\theta_9$ said first logic means produces during each even octant a second output voltage whose amplitude varies approximately as the sine function over the 135°–180° range, and which is the mirror image of said first voltage signal. Second logic means is responsive to said reference voltage, said first voltage signal and also to $\theta_9$ to empirically produce a third voltage signal during each odd octant whose amplitude varies approximately as the cosine of $\theta_9$ from 0° – 45°. Said second logic means is also responsive to the mirror image of said first signal, said reference voltage, and also to $\theta_9$ to produce a fourth voltage signal which is a mirror image of said third voltage signal. A signal selecting means is constructed to respond to the three most significant bits of $\theta_{12}$ to identify the desired octant indicated by $\theta_{12}$, and then to select the proper combination of voltages being generated by said first and second logic means, and to assign the proper polarity thereto, all in accordance with a truth table, in order to generate the sine and cosine voltage signals that are needed to drive the synchro shaft to the angular position defined by $\theta_{12}$.

In accordance with a feature of the invention the said first and second logic means comprise a ladder network which is constructed to respond to the reference voltage and to the value of $\theta_9$ to produce an output voltage whose amplitude varies directly as $\theta_9$. Various attenuation circuits are also provided which respond to certain bit positions of $\theta_9$ to cause the amount of said attenuation to be different over three predetermined and contiguous segments of each 45° octant, thereby modifying what otherwise would be a linearly changing voltage from said ladder network during each octant into a close approximation of a sine function over 0° – 45°.

The three predetermined segments of each 45° octant are equal to 0° – 22.5°, 22.5° – 35.75° and 35.75° – 45°, with the largest segment always being measured from the quadrant marker nearest the quadrant involved. Thus by inverting $\theta_9$ as $\theta_{12}$ goes from 45° to 90° the angle represented by $\theta_9$ decreases from a maximum of 45° – 0° thereby in effect using the 90° quadrant marker as its 0° reference. Consequently, it can be seen that the effect of complementing $\theta_9$ during each even quadrant is to cause the two octants bordering each quadrant marker to use that quadrant marker as a 0° reference.

BRIEF DESCRIPTION OF THE DRAWINGS

FIG. 4 is a chart showing the logic and means for modifying a straight into three straight line segments which closely approximate sine and cosine functions of $\theta_9$ over a 0° – 45° range and also over a 45° – 90° range;

FIG. 5 is another chart showing the relation between the 45° segments of the sine and cosine functions of $\theta_9$ and the position of said segments with respect to the 90° quadrant markers of a 360° cycle to define complete sine and cosine functions of $\theta_{12}$;

FIGS. 6 and 7 are schematic diagrams of portions of a R – 2R type ladder network employed in the invention.

The description of the invention will be organized in the following manner:

I - GENERAL DESCRIPTION OF INVENTION
II - DESCRIPTION OF OPERATION
A - IMPLEMENTATION OF SCALE FACTOR SF
B - IMPLEMENTATION OF FACTOR $\theta_9/45°$
C - IMPLEMENTATION OF FACTOR A
D - IMPLEMENTATION OF FACTOR B
E - CONSTRUCTION OF $e_1$ and $e_2$ from $E_1$ and $E_2$ Throughout this specification it is to be understood that the 12-data bit word representing the desired synchro angle and appearing in data register 12, is to be designated as data word $\theta_{12}$ with its 12-bit positions being identified as $0_0$, $0_1$, $0_2$ – – – $0_{11}$, and with $0_0$ being the least significant bit.

The 9 bit data word contained in the complement logic 28, and representing a 0°–45° segment of $\theta_{12}$ in either complemented or non-complemented form, is herein designated as data word $\theta_9$ with its nine-bit positions being identified as $\alpha_0$, $\alpha_1, \ldots \alpha_8$, and with $\alpha_0$ being the least significant bit position.

I-GENERAL DESCRIPTION OF INVENTION

Figure 1:
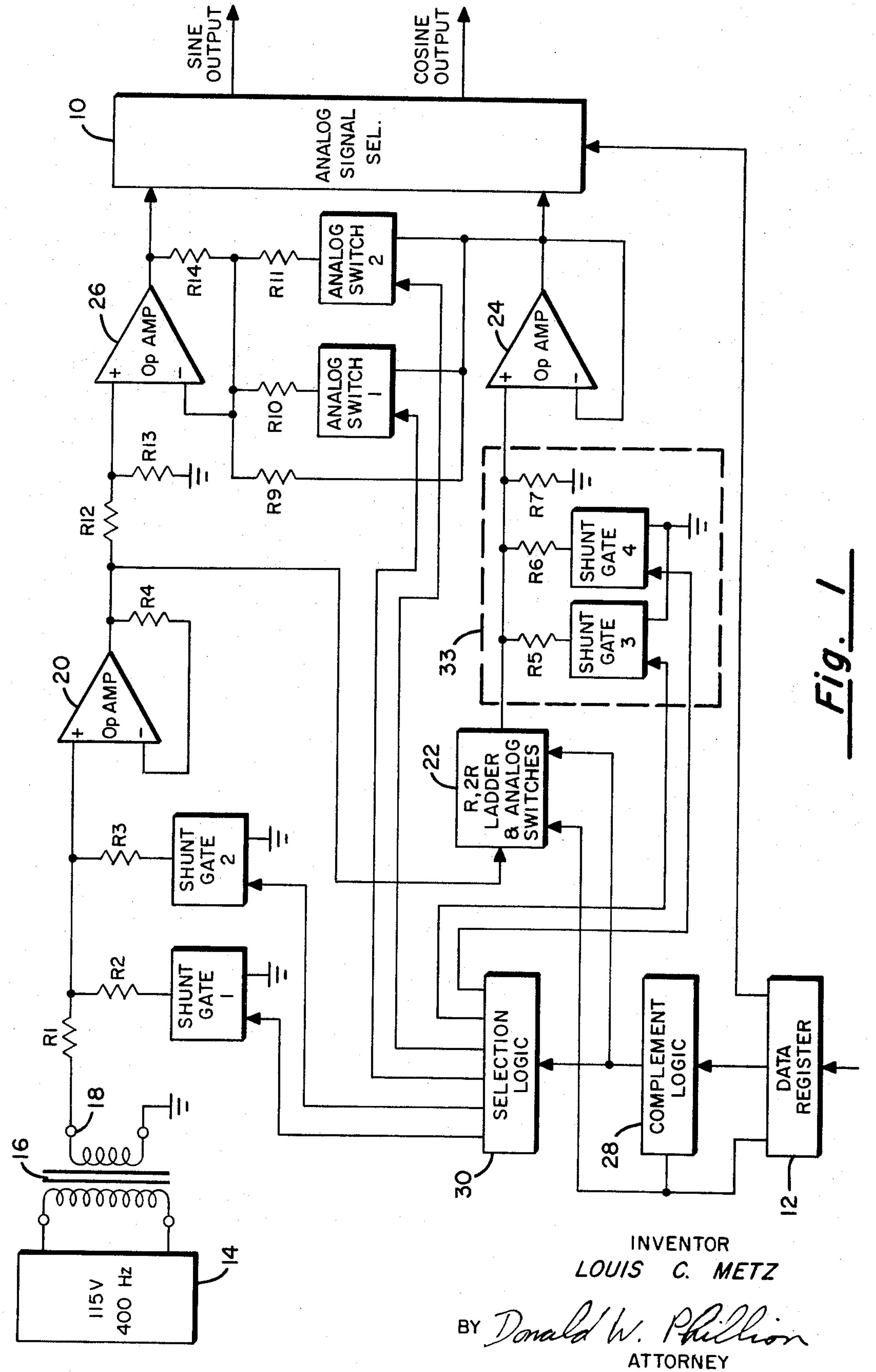
FIG. 1 is a combined logic and schematic diagram of the invention.

With particular reference to FIG. 1 there is presented a block diagram of the digital-to-analog converter system of the present invention. A function of the system shown in FIG. 1 is to produce at the two outputs of the analog signal selector 10 the sine and cosine synchro voltage signals $e_1$ and $e_2$ from a 12-bit digital data word $\theta_{12}$ supplied from the data register 12 where $\theta_{12}$ is the digital representation of the synchro angle $\theta_A$.

The function of the system shown in FIG. 1 is to amplitude modulate an analog reference voltage $V_{ref}$ in accordance with a 12-bit data word $\theta_{12}$ in such a manner as to produce the following sine and cosine voltage signals $e_1$ and $e_2$:

$$e_1 \cong V_{ref} \text{ sine } \theta_{12} \quad \text{(Exp. 1)}$$

$$e_2 = V_{ref} \text{ cosine } \theta_{12} \quad \text{(Exp. 2)}$$

where $\theta_{12}$ represents that synchro angle and is supplied to the system in digital form via data register 12.

Since the data word $\theta_{12}$ increases linearly with synchro shaft angle but the sine or cosine function thereof does not, it is necessary to literally construct an analog voltage which varies as the sine $\theta_{12}$ or as the cosine $\theta_{12}$, in response to linear changes in $\theta_{12}$.

However, while the 12-bit data word $\theta_{12}$ does represent the synchro angle $\theta_A$ from 0° to 360° it is not necessary to construct analog sine and cosine functions of $\theta_{12}$ over the entire 360° in order to produce the desired signals $e_1$ and $e_2$. More specifically it is only necessary to construct the sine and cosine functions over a range of 0° – 45° and a range of 45° – 90° in order to reproduce the continuous sine and cosine functions of $e_1$ and $e_2$.

Figure 2:
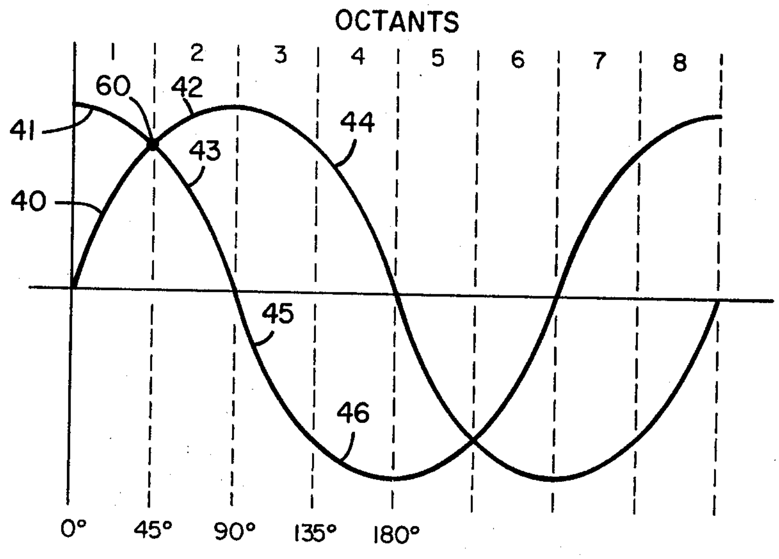
FIG. 2 shows how complete sine and cosine functions can be constructed from 0° – 45° and 45° – 90° segments of the sine and cosine function.

The foregoing is illustrated in the graph of FIG. 2 wherein the segment 40 represents the sine of $\theta_{12}$ from 0° – 45°, and the segment 41 of the cosine curve represents the cosine of $\theta_{12}$ from 0° – 45°. If the segments 41 and 40 can be produced from a series of digital words then the segments 42 and 43, which are mirror images of the segments 41 and 40, can also be produced by said same series of digital words generated in reverse order. It can be seen in FIG. 2 that the mirror image 42 of the cosine function segment 41 can be employed to complete the sine wave function from 45° – 90°. Similarly the mirror image 43 of sine function segment 40 is employed to complete the cosine function from 45° – 90°.

In order to form the negative half cycles of the sine and cosine functions the segments 40 and 41 and their mirror images 43 and 42 are inverted, i.e., their polarity is reversed. Thus in forming the cosine function over the range of 90° – 135° (octant 3) the segment 45 is formed from the inverted segment 40 of the sine function over 0° –45°. The segment 46 of the cosine function is formed by both inverting and taking the mirrored image of the segment 41 of the cosine function from 0° – 45°.

In a similar manner all of the remaining portions of the complete sine and cosine function of $\theta_{12}$ can be formed from the analog segments 40 and 41 and their mirror images 43 and 42.

The structure of FIG. 1 is designed to generate the four segments 40, 41, 42 and 43. More specifically the sine function segment 40 appears at the output of operational amplifier 24 every odd octant and its mirror image segment 43 appears at the output of said amplifier 24 every even octant:

similarly the cosine function segment 41 appears at the output of operational amplifier 26 every odd octant and its mirror image segment 42 appears at the output of said operational amplifier 26 every even octant.

It is to be noted that while the output of operational amplifier 24 is denoted generally as $E_1$, it is in fact composed of alternate generations of the segments 40 and 43 of FIG. 2 depending upon which 45° octant of the 360° cycle of $\theta_{12}$ is being generated.

Similarly while the output of operational amplifier 26 is denoted generally as $E_2$ it is in fact composed of alternate generations of the segments 41 and 42, the particular segment being generated being dependent upon which 45° octant of $\theta_{12}$ is being supplied to the system.

Thus the following generalizations can be set forth: In constructing the segments 40 and 41 only the first nine bits $0_0 – 0_8$ of $\theta_{12}$ are employed. The additional bit $0_9$ is needed to construct the mirrored segments 42 and 43. The remaining two bits $0_{10} – 0_{11}$ are employed to piece together the segments 40 – 43 in the proper manner to construct the signals $e_1$ and $e_2$.

More specifically the data word $\theta_{12}$ in register 12 is an everchanging binary word which in effect counts from 0 to its maximum capacity in equal increments, and with each increment representing equal angular displacements along the cosine and sine axes. A complete cycle of counting by said word $\theta_{12}$ represents an angular displacement of 360°. Further it is to be noted that the nine least significant bits $0_0 – 0_8$ of $\theta_{12}$ will recycle each 45° of angular displacement. Thus only these nine least significant bits $0_0 – 0_8$ are necessary to generate the segments 40 and 41 of FIG. 2. Then through the use of the remaining three bits $0_9 – 0_{11}$ of $\theta_{12}$, the segments 42 and 43 can be reproduced in mirrored and/or inverted form to reproduce the entire cosine and sine functions $e_1$ and $e_2$ over 360°.

More specifically the nine least significant bits $0_0 – 0_8$ of $\theta_{12}$ are supplied to complement logic 28 in FIG. 1 to form a data word which will be identified herein $\theta_9$. $\theta_9$ is identical to the first nine bits $0_0 – 0_8$ of $\theta_8$ of $\theta_{12}$ during every odd octant (see FIG. 2). However, during every even octant $0_9$ of $\theta_{12}$ becomes a binary "1" and functions to activate complement logic 28 to complete the data word $\theta_9$. Thus, for example at 45°, $\theta_{12}$ contains the binary word "001000000000," where $0_9$ is a binary "1." The data word $\theta_9$ in complement logic 28 is thereby inverted to become "111111111." Then as the count of $\theta_{12}$ increases, the count in $\theta_9$ will decrease, i.e., count down towards zero.

Thus, it can be seen that the count in word $\theta_9$ in complement logic 28 counts from 0 to its maximum count within the 0° – 45° range. At precisely 45° the count of $\theta_9$ would become all zeros were it not complemented.

It can be seen however that the true complement of binary word "000000000," which represents a 45° angle, is in fact $2^{10}$ which is one count greater than the binary word "111111111." ' A correction for this small discrepancy is made in the system in a manner to be discussed in detail later.

Because the synchro angle $\theta_A$ bears a linear relation to the count in $\theta_{12}$ and the amplitude of the sine and cosine functions bear non-linear relations to said count, the said sine and cosine function (segments 40 – 43 of FIG. 2) cannot be obtained directly from $\theta_9$. To solve the foregoing problem the following empirical relations have been devised.

$$E_1 = E_{40} \cong A(\theta_{9/45})\, V_{ref}\, SF \qquad \text{(Exp. 3)}$$

for even octants where $\theta_9$ is increasing $$E_1 = E_{43} \cong A(\theta_{9/45})\, V_{ref}\, SF \qquad \text{(Exp. 4)}$$

for odd octants where $\theta_9$ is decreasing $$E_2 = E_{41} \cong V_{ref}\, SF - BE_1 \qquad \text{(Exp. 5)}$$

for even octants where $\theta_9$ is increasing $$E_2 = E_{42} \cong V_{ref}\, SF - BE_1 \qquad \text{(Exp. 6)}$$

for odd octants where $\theta_9$ is decreasing where *A*, *B*, and *SF* are all constants which change over given angular sections with each 45° octant.

Each of the factors *A*, *B*, and *SF* will be more clearly understood from the following paragraphs which discuss in detail how the empirical expressions 3 and 4 are derived.

Figure 3:
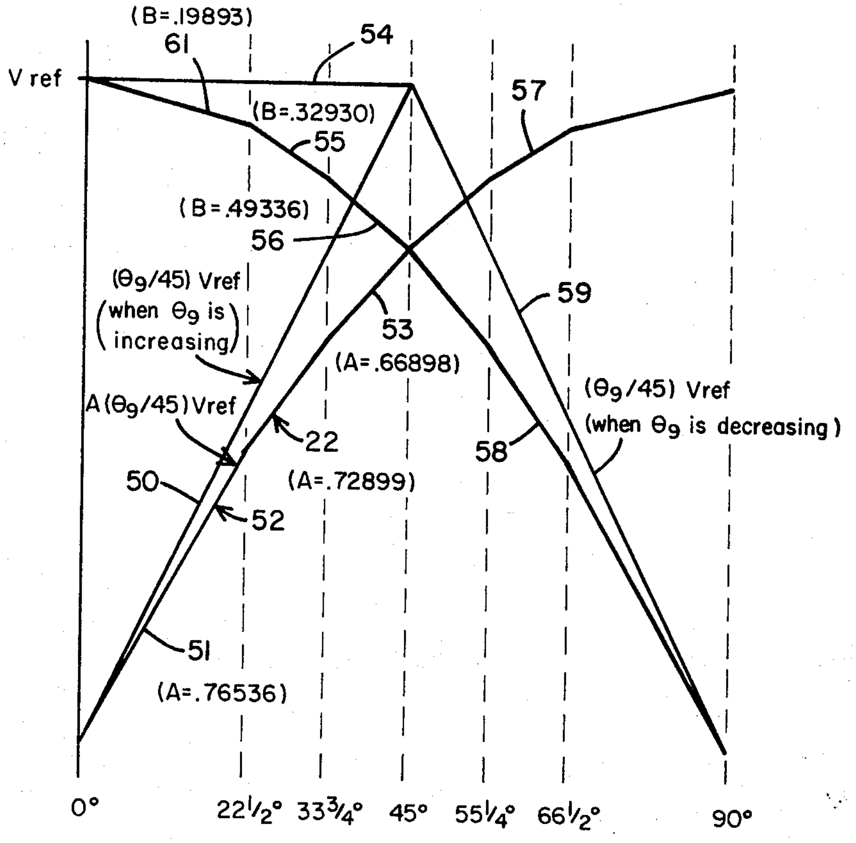
FIG. 3 shows how 0° – 45° and 45° – 90° segments of a sine or a cosine function of $\theta_9$ can be closely approximated from three straight lines.

The factor $\theta_{9/45}$ ($V_{ref}$) is a straight line function represented by the lines 50 and 59 of FIG. 3 since $\theta_9$ increases or decreases linearly during alternate octants. Thus during the first octant, when $\theta_9$ is increasing, the quantity $\theta_{9/45}$ ($V_{ref}$) will increase linearly as represented by the straight line 50 to a maximum value of $V_{ref}$ at point 60.

By dividing each 45° octant into three angular sections of 0° – 22½°, 22½° –33¼° and 33 ¾° – 45°, and giving different values to the factor *A* for each of these three segments the curve 50 can be modified into the curve 52 of FIG. 3, which curve approximates very closely a sine function between 0° and 45°. (The factor *SF* will be discussed separately later herein).

Similarly the expressions 5 and 6 are obtained by starting with the curve 54 of FIG. 3, which is equal to $V_{ref}$, and then subtracting from said curve a proportional amount of the sine wave curve 52, such proportional amount being determined by the value of factor *B*, which has different values over the same three angular sections employed in constructing curve 52. Thus the three segments 61, 55 and 56 of FIG. 3 form a close approximation of a cosine wave over the range of 0° to 45°.

After the values of factors *A* and *B* have been obtained to approximate the sine and cosine functions, another factor *SF* is introduced to further define the approximation. More specifically the values of *SF are computed for the same three angular sections employed in calculating A* and *B*. The values of *SF* are such as to yield an approximately constant power output from the converter. More specifically the following relation is established by properly selecting values of *SF*.

$$E_l^2 + E_2^2 \cong V_{ref}^2$$

Consider now the method of computing the factors *A* and *B*. The actual angle $\theta_A$ represented by the converter of the system of FIG. 1 is determined by the following expression:

$$\theta_A = \text{Tan}^{-1}\, E_1/E_2 \qquad \text{(Exp. 7)}$$

However, by definition $E_1$ and $E_2$ are approximations so that $\theta_A$ is not correct but only an approximation. The inherent error in the converter consequently is defined as follows:

$$\text{Error} = \theta_A - \theta_{12} \qquad \text{(Exp. 8)}$$

Substituting for $\theta_A$ from Expressions 6, and for $E_1$ and $E_2$ from Expressions 3 and 5 there is obtained the following expressions:

$$\text{Error} - \text{Tan}^{-1} \frac{A\ (\theta_{9/45°})}{1 - AB\ (\theta_{9/45°})} - \theta_{12} \qquad \text{(Exp. 9)}$$

Then by setting the error equal to zero at 11¼° and 22**°, two equations can be obtained from Expression 9 which can be solved simultaneously to provide the values of factors $A$ and $B$ for the angular segment 0° to 22½°. The values of $A$ and $B$ for the angular segments from 22½° to 33 ¾° and from 33 ¾° to 45° can be similarly obtained by setting the error equal to zero for the angular values of 22½°, 33 ¾ and 45° and then solving for the values of $A$ and $B$.

The values for the factors $SF$, $A$ and $B$ calculated in accordance with the above principles, are shown in columns 5, 8 and 11 of the table of FIG. 4.

In a manner which will be discussed in more detail later herein the values of resistors R1, R2 and R3 in FIG. 1, and the states of shunt gates No. 1 and No. 2 determine the electrical value of factor $SF$. *The voltage* $SF$ ($v_{ref}$) is multiplied by the factor $A$ and by $\theta_{9/45}$ to produce the analog voltage signal $E_1$. More specifically the value of factor $A$ is determined by resistors R5, R6, R7, the output resistance of ladder network 20 and the states of shunt gates No. 3 and No. 4.

Considering now the generation of $E_2$, a unity gain for $SF$ ($V_{ref}$) through operational amplifier 26 is determined by selecting the values of resistors R12, R13, R14 and the parallel equivalent ($R_p$) of resistors R9, R10 and R11 so that $$\frac{R13}{R12 + R13} = \frac{Rp}{Rp + R14}$$

The factor $B$ is determined by resistors R9, R10, R11 and R14 and the states of analog switches No. 1 and No. 2.

The state of shunt gates Nos. 1–4 and the analog switches No. 1 – No. 2 are controlled by the value of the digital data word $\theta_9$ through complement logic 28 and selection logic 30.

As indicated above, operation of the converter of FIG. 1 covers the range of $\theta_{12}$ from 0° to 360° by means of the data word $\theta_9$ which is used in either its complemented or non-complemented form so that it always represents the difference between the angle to be converted and the nearest quadrant angle marker (0°, 90°, 180°, 270°).

The foregoing is important in understanding the invention. More specifically a complete cycle of 360° is divided into eight octants of 45° with each 45° segment being represented by $\theta_9$, and with each segment always being measured from the nearest 90° quadrant marker.

The analog signal selector 10 selects the proper forms of the 0° – 45° sine and cosine segments $E_{40}$ and $E_{41}$ to construct the synchro sine and cosine output signals $e_1$ and $e_2$ in accordance with the table of FIG. 4 which will be discussed in detail later.

In analog selector 10 the selection of the proper forms of the segments $E_{40}$ and $E_{41}$ is determined by the three most significant bits $0_9$, $0_{10}$ and $0_{11}$ of the data word $\theta_{12}$, which three bits represent angular displacements of 180°, 90° and 45°, respectively, in said data word $\theta_{12}$. The relation between bits $0_9$, $0_{10}$ and $0_{11}$ and the selection of the proper forms of $E_{40}$ and $E_{41}$ is also shown in the table of FIG. 4.

II-DESCRIPTION OF OPERATION

A sinusoidal source voltage from generator 14 of 115 volts, 400 Hz is coupled to the converter of FIG. 1 by means of transformer 16 to provide a voltage equal to 1.08 $V_{ref}$, which voltage is then scale factored (multiplied by factor $SF$) by connecting certain ones of the associated resistors R1, R2 and R3 into the circuit. More particularly, the scale factor $SF$, as set forth in column 5 of FIG. 4, is determined by the state of shunt gates No. 1 and No. 2, and the resulting open circuiting or grounding of resistors R2 and R3. The three angular sections and their associated $SF$ factors are as noted in columns 2 and 5 of FIG. 4. The condition of shunt gates No. 1 and No. 2 in turn is determined by the logical significance of bits $\alpha_8$ and $\alpha_7$ of the data word $\theta_9$ contained in complement logic 28, as noted in column 1 of FIG. 4, and are logically implemented by selection logic 30. The selected scale factor $SF$ scales the voltage (1.08 $V_{ref}$) appearing at point 18 in FIG. 1 down to a value $SF$ ($_{ref}$). Operational amplifier 20 is a unity gain follower to obtain high input impedance and low output impedance for driving ladder network 22, the resistors R12, R13 and the operational amplifier 26.

V-A-DETERMINATION OF SCALE FACTOR SF

An inspection of the table of FIG. 4 shows the requirements for determining the scale factor $SF$ within each of the three angular ranges of the 0° – 45° segment of the sine and cosine functions being generated. Such requirements are summarized below:

a. $45° \geqslant \theta \geqslant 35.75°$ — A scale factor $SF$ of 1.08 is needed. Thus when the bits 8 and 7 of $\theta_9$ are "1" and "1" respectively, shunt gates 1 and 2 are OFF and resistors R2 and R3 are open circuited. The voltage 1.08 $V_{ref}$ appearing at node 18 in FIG. 1 also appears at the output of amplifier 20.

b. $35.75° > \theta \geqslant 22.50°$ — A scale factor $SF$ of 1.03 is desired. Thus when bits 8 and 7 of $\theta_9$ are "1" and "0" respectively, shunt gate 1 is OFF and shunt gate 2 is ON, thereby coupling resistor R3 to ground and open circuiting resistor R2. The resistors R1 and R3 then form a voltage divider to scale the voltage 1.08 $V_{ref}$ at point 18 down to a value of 1.03 $V_{ref}$.

c. $22.50° > \theta \geqslant 0°$ — A scale factor $SF$ a 1.01 is desired. Thus when the bit 8 of $\theta_9$ is "0", (bit 7 can be either "0" or "1"), shunt gates 1 and 2 are both ON, thereby coupling resistors R1 and R2 to ground. The voltage 1.08 $V_{ref}$ appearing at point 18 is scaled down to a value of 1.01 $V_{ref}$ at the output of amplifier 20.

II-B-DETERMINATION OF ANALOG FACTOR ($\theta_{9/45}$)

The voltage $SF$ ($V_{ref}$) is gated into the linear ladder network 22 by nine analog switches, which are located within said ladder network 22 and which are individually controlled by the state of each bit of the nine-bit word $\theta_9$ from the complement logic 28. It will be recalled that the quantity $\theta_{9/45}$ ($V_{ref}$) is a linear function of $\theta_9$ as shown by the curve of FIG. 3. More specifically as the binary value of the data word $\theta_9$ increases in equal increments from 0 to its maximum value, the amplitude of the output signal from ladder network 22 will also increase linearly (as modified by the changes in factor $SF$, however).

It will also be recalled that the nine bits $\alpha_0 - \alpha_8$ of $\theta_9$ count from 0 to their maximum every odd octant and then back down from their maximum to 0 every even octant. It is apparent that the output of ladder network 22 will be comprised of alternately occurring segments 50 and 59 in successive octants of the synchro angle $\theta_{12}$ (modified by $SF$, however).

The bits $\alpha_8$ and $\alpha_7$ of $\theta_9$ always function to properly change the values of factors $SF$, $A$ and $B$ whether $\theta_9$ is in its complement mode or its non-complement mode. Thus the bits $\alpha_8$ and $\alpha_7$ will automatically measure the angular distance of the complemented word $\theta_9$ from the nearest 90° quadrant marker. For example, the angular distance of the beginning point 60 of segment 43 of FIG. 2 will be measured by bits $\alpha_8$ and $\alpha_7$ as being 45° from the 90° quadrant marker of FIG. 2. Thus the bits $\alpha_8$ and $\alpha_7$ of $\theta_9$ will function to select the proper values of the factors $A$, $B$ and $SF$ regardless of whether the segment 40 of FIG. 2 is being constructed, or its mirror image segment 43.

It will be recalled that in the even octants 2, 4, 6 and 8 it is necessary to construct a mirror image of the sector $E_{41}$, and since the ninth position $0_9$ of $\theta_{12}$ is always a binary "1" in such even octants, it is employed to control the complement logic 28 of FIG. 1. More specifically when bit $0_9$ is a "1" the output word $\theta_9$ of complement logic 28 is the complement of bits $0_0 - 0_8$ of word $\theta_{12}$ in data register 12. When $0_9$ is a "0" then the word $\theta_9$ is the same as bits $0_0 - 0_9$ of $\theta_{12}$. Reference is made to columns 1 and 4 of FIG. 5 which show the above-described relation between bit $0_9$ of word $\theta_{12}$ and the complement status of word $\theta_9$.

The bits $0_9$, $0_{10}$ and $0_{11}$ of $\theta_{12}$ are supplied to the analog signal selector 10 of FIG. 1 to construct the sine and cosine output signals $e_1$ and $e_2$ from the 45° segments $E_1$ and $E_2$ in a manner which will be described below in section *V-E*

Returning again to the output $\theta_9$ of complement logic 28, said output $\theta_9$ is supplied to the ladder network 22 which is shown in schematic form in FIGS. 6 and 7.

The ladder network of FIG. 6 is known in the art as an R, 2R ladder network and has a characteristic of dividing a voltage supplied at an input terminal by integral powers of two. Thus for example, a given voltage $V_1$ supplied at input terminal 110 is divided by $2^1$ at junction 114, divided by $2^2$ at junction 115, and divided by $2^3$ at junction 116. Similarly a voltage $V_2$ supplied to input terminal 111 is divided by $2^1$ at junction 115 and by $2^2$ at junction 116. A voltage $V_3$ applied to input terminal 112 is divided by $2^1$ at junction 116. Thus if all three contact arms 107, 108 and 109, which are normally connected to ground potential, are in fact connected to input terminals 110, 111 and 112, respectively, the voltage appearing at junction 116 is as follows:

$$V_1/8 + V_2/4 + V_3/2$$

The voltages are divided down by powers of two as discussed above due to the particular configuration of the resistors in the network. More specifically it will be seen that resistors having a value *R* are connected in series between the terminals 114, 115 and 116. Other resistors having a value 2*R* are connected in parallel to ground from each of the terminals 114, 115 and 116. At the end of the ladder terminating resistor 101 having a value 2*R* is connected to ground potential. As an example of the operation of the circuit it can be seen that if arm 107 is closed to input terminal 110 the voltage $V_1$ is divided in half at junction 114 by the two equal resistors 101 and 102.

Furthermore, the impedance to ground from junction 114 can be seen to be equal to *R* since resistors 101 and 102 are connected in parallel from junction 114. The impedance to the left of junction 115 can be seen to be equal to 2*R* since resistor 105 is connected in series with the two parallel resistors 101 and 102 each having a value of 2*R*. The impedance of junction 115 to ground through the remainder of the ladder network, including resistors 103, 106, 104 is also equal to *R*, which is the characteristic impedance of this type ladder network. Consequently the voltage at point 114 is divided across the resistor 105 having a value of *R* and the remainder of ladder network, which also has a resistance R. Consequently the voltage at junction 115 one-half the voltage at junction 114, or $V_1/4$.

In FIG. 7 there is shown a form of the ladder network in which all of the reference voltages are the same and are equal to *SF* ($V_{ref}$) which is supplied to input terminal 110′. The switch arms 107′, 108′, and 109′ are closed upon the input terminal 110′ when binary "1's" exist in bit positions $\alpha_0$, $\alpha_1$, and $\alpha_2$ respectively, of word $\theta_9$.

More specifically, in the ladder network there is a switch, such as switch 107′, for each of the nine bits of the data word $\theta_9$. When the data word $\theta_9$ = 111111111 then all nine switches, such as switch 107′ are closed and the voltage appearing on output terminal 100′ is equal to:

$$SF\ (V_{ref})\ (2^9-1)/2^9$$

The output voltage from the ladder network appearing at output terminal 100′ has thus increased from a value of 0 corresponding to $\theta_9 = 0$ to a near maximum value as $\theta_9$ reaches its maximum. When $\theta_9$ reaches a value of 111111111, then an additional count of 1 will change the value of $\theta_9$ to 0 and bit $0_9$ of the data word $\theta_{12}$ will become a binary "1." This condition occurs every odd multiple of 45° which corresponds to the beginning of all even octants, as discussed in connection with FIG. 2.

The logic of the system must now construct the mirror image of the segment 41 of FIG. 2. To do so $\theta_9$ must count from a maximum value down to 0. Worded in another way to produce the mirror image 13 of segment 11 the output voltage from the ladder network must start from its maximum value and then decrease towards 0. To accomplish this the count of the data word $\theta_9$ must start at a maximum and decrease. Since $\theta_9$ ordinarily would count from 0 towards maximum at all multiples of 45°, the 1's complement thereof must be taken at all odd multiples of 45° so that $\theta_9$ becomes all binary "1's" at said odd multiples of 45°. Such 1's complement is effected by complement logic 28 of FIG. 1 and occurs as a result of a binary "1" being in bit position $0_9$ of data word $\theta_{12}$.

However, the 1's complement of an all binary "0" $\theta_9$ word is not precisely equal to the binary representation of 45°, which is "1000000000" 32 $2^9$. The 1's complement is, in fact, one count short. To compensate for the aforementioned shortage of 1 count, an additional switch 118 is added to the ladder network of FIG. 7.

The closing of switch 118 is effected by a presence of a binary "1" in bit position $0_9$ of $\theta_{12}$ in data register 12, and in effect functions to add another one-half *SF* ($V_{ref}$) at the junction 114′ of FIG. 7, which is the equivalent of adding another binary "1" in bit position $0_0$ to the analog voltage generator of FIG. 7.

To summarize, in order to generate the segment 40 of FIG. 2 the data word $\theta_9$ counts from 0 to its maximum with appropriate modifications of the output resistors R5, R6 and R7 of ladder network 22 being modified by the bits $\alpha_7$ and $\alpha_8$ of $\theta_9$ to generate the factor A. To generate the segment 43 of FIG. 2, the data word $\theta_9$ must count from its maximum towards 0 in order to generate a voltage at the output of ladder network 22, which voltage begins at the maximum value and decreases towards 0, again modified by the factor A.

Thus the data word $\theta_9$ appearing in the complement logic 28 goes through a continuous cycle of counting from 0 to its maximum and then counting from its maximum back to 0 and then again counting back up towards its maximum. The voltage segments 40 and 43 which are generated thereby are supplied to the analog selector 10 which uses such segments in their generated form or in their inverted form in the construction of the output signals $e_1$ and $e_2$.

The segments 41 and 42 of FIG. 2 are then generated from segments 40 and 43 as discussed in foregoing sections.

The output of the ladder network 22 of FIG. 1 is supplied to a resistor network 33 which modifies the ladder network output by the factor A. A detailed description of the operation of the resistor network 33 and the determination of factor A follows.

II-C DETERMINATION OF FACTOR A

The value of factor A is determined by the resistors R5, R6 and R7 and the shunt gates No. 3 and No. 4 which connect resistors R5 and R6 into the circuit in accordance with the condition of bits $\alpha^7$ and $\alpha_8$ of the data word $\theta_9$ in the manner summarized below.

a. 45° ≥ $\theta$ ≥ 33.75° — Bit 8 (22.5°) = "1" and bit 7 (11.25°) = "1"; shunt gates 3 and 4 are ON and ladder network 22 is loaded to 0.66898 of its open circuit value by virtue of resistors R5, R6, R7 all being connected to ground in parallel with each other. Factor A = 0.66898.

b. 33.75 > $\theta$ ≥ 22.5° — Bit 8 (22.50°) = "1" and bit 7 (11.25°) = "0"; shunt gate 3 is ON and shunt gate 4 is OFF and ladder network 22 is loaded to 0.72899 of its open circuit value by virtue of resistors R5 and R7 being connected to ground. Factor *A* = 0.72899.

c. 22.50° > $\theta$ ≥ 0° — Bit 8 (22.50°) = "0" and bit 7 (11.25°) may be "1" or "0," shunt gates 3 and 4 are OFF and ladder network 22 is loaded to 0.76536 of its open circuit value by virtue of resistor R7 only being connected to ground. Factor *A* = 0.76536.

The voltage $(SF)$ $(V_{ref})$ $(\theta/45°)$ $(A)$ is buffered by operational amplifier 24 that is a unity gain follower to obtain low output impedance. This voltage is the analog voltage $E_1$ defined in Exp. 3 and Exp. 4.

II-D DETERMINATION OF FACTOR B

Operational amplifier 26, resistors R9, R10, R11, R12, R13, R14 and analog switches 1 and 2 form a circuit which combines its inputs, $SF$ $(V_{ref})$ and $E_1$ to form $E_2$ in the following manner: :

$$E_2 = \frac{R13\ (R14 + Rp)}{(R12 + R13)\ Rp} SF\ (V_{ref}) - \left(\frac{R14}{R9} + S1\ \frac{R14}{R10} + S2\ \frac{R14}{R11}\right) E1 \quad \text{(Eq. 9)}$$

Where $R_p$ is equivalent to the parallel equivalence of resistors R9, R10, R11, and where $S1$ and $S2$ represent the states of analog switches 1 and 2, respectively with OFF = "0" and ON = "1." As discussed above in Section IV the resistors are selected to have the following relation.

$$\frac{R13\ (R14 + Rp)}{(R12 + R13)\ Rp} = 1$$

Therefore, expression 9 becomes, $$E_2 = SF\ (V_{ref}) - \left(\frac{R14}{R9} + S1\ \frac{R14}{R10} + S2\ \frac{R14}{R11}\right) E_1$$

and the factor, $$\left(\frac{R14}{R9} + S1\ \frac{R14}{R10}\ S2\ \frac{R14}{R11}\right)$$

is equivalent to factor $B$ of Expressions 5 and 6.

For the three angular ranges involved the value of factor $B$ is then determined by the following conditions which are also set forth in the table of FIG. 2.

a. $0° \leq \theta < 22.50°$ — Bit 8 (22.50°) = "0," bit 7 (11.25°) may be "0," analog switches 1 and 2 are OFF and factor $B$ is equal to $R14/R9 = 0.19893$.

$22.5° \leq \theta < 33.75°$ — Bit 8 (22.50°) = "1," bit 7 (11.25°) = "0", analog switch 1 is ON, analog switch 2 is OFF and factor $B$ is equal to (R14/R9 + R14/R10) = 0.32930.

c. $33.75° \leq \theta \leq 45°$ — Bit 8 (22.50°) = "1" bit 7 (11.25°) = "1", analog switches 1 and 2 are both ON and factor $B$ is equal to (R14/R9 + R14/R10) + R14/R11) = 0.49336.

II-E CONSTRUCTION OF $e_1$ AND $e_2$ FROM $E_1$ AND $E_2$

The analog voltage signals $E_1$ and $E_2$ are switched into output amplifiers in the analog signal selector 10 of FIG. 1 for sine and cosine ($e_1$ and $e_2$) determination, according to the Table B of FIG. 3, to obtain the synchro angle $\theta$ from 0° to 360°. As discussed above the data word $\theta_9$ utilized by the converter of FIG. 1 to generate the segments $E_1$ and $E_2$ represents the difference between the required angle $\theta_9$ and the nearest quadrant angle marker 0°, 90°, 180°, 270°, 360° rather than the actual required angle itself. The output amplifiers of analog signal selector 10 drive transformers (not shown) whose outputs drive the associated synchro resolver (not shown).

As discussed above the outputs $E_1$ and $E_2$, which are supplied to the analog signal selector 10 of FIG. 1, can each represent different voltage waveforms as shown in FIG. 2. More specifically the output $E_1$ can represent either the segment 40 of the segment 43, depending upon whether count $\theta_9$ is increasing or decreasing. In a similar manner the signal $E_2$ can represent segment 41 or 42. Worded in another way the output $E_1$ consists of segment 40 in all of the odd octants of FIG. 2, although its polarity is reversed in octants 3 and 5. In the even octants the signal $E_1$ is equal to the segment 43 although it has its polarity reversed in octants 6 and 8.

The eight octants shown in FIG. 2 are also indicated in column 2 of FIG. 5. In column 4 of FIG. 5 the direction of count of the data word $\theta_9$ is indicated. In columns 6 and 7 of FIG. 5 there is shown which of the output signals $E_1$ or $E_2$ must be selected to construct the output signals $e_1$ and $e_2$ for the particular octant involved. Thus, in octant No. 1 the output signal $E_1$ is selected to be used in the sine function output $e_1$ and the output signal $E_2$ is selected for the cosine function output $e_2$.

It will be recalled that both of the output signals $E_1$ and $E_2$ represent two different 45° segments, as shown in FIG. 2. The particular 45° segments employed in constructing the synchro driving output signals $e_1$ and $e_2$ are determined by the quadrant involved. In the example discussed above, i.e., in octant No. 1 the output $E_1$ represents the segment 40 in FIG. 2 and the output $E_2$ represents the segment 41. However, in octant No. 2 the output $E_1$, which is used in constructing the cosine output $e_2$, represents the segment 43 of FIG. 2 and the output $E_2$, which is used to construct the sine output $e_1$, represents the segment 42 in FIG. 2. These segments 40, 41, 42 and 43 are included in FIG. 5 in columns 6 and 7 within parenthesis, and identified as $E_{40}$, $E_{41}$, $E_{42}$ and $E_{43}$, respectively.

The segments 40 and 43 are produced alternately from the complement data word $\theta_9$, by virtue of $\theta_9$ being complemented every alternate octant. Similarly, the segments 41 and 42 are generated in an alternate manner.

It can be easily seen from the chart of FIG. 2 how the various 45° segments of $E_1$ and $E_2$ should be selected to construct the output sine and cosine voltage functions $e_1$ and $e_2$. Specifically such selection is determined directly by the particular octant involved, and with said particular octant involved being determined by the three data bits $0_9$, $0_{10}$ and $0_{11}$ of the 12-bit data register word $\theta_{12}$. The various combinations of such three bits $0_9$, $0_{10}$ and $0_{11}$ which define the eight 45° octants of a 360° cycle are indicated in column 1 of FIG. 5.

Figure 8:
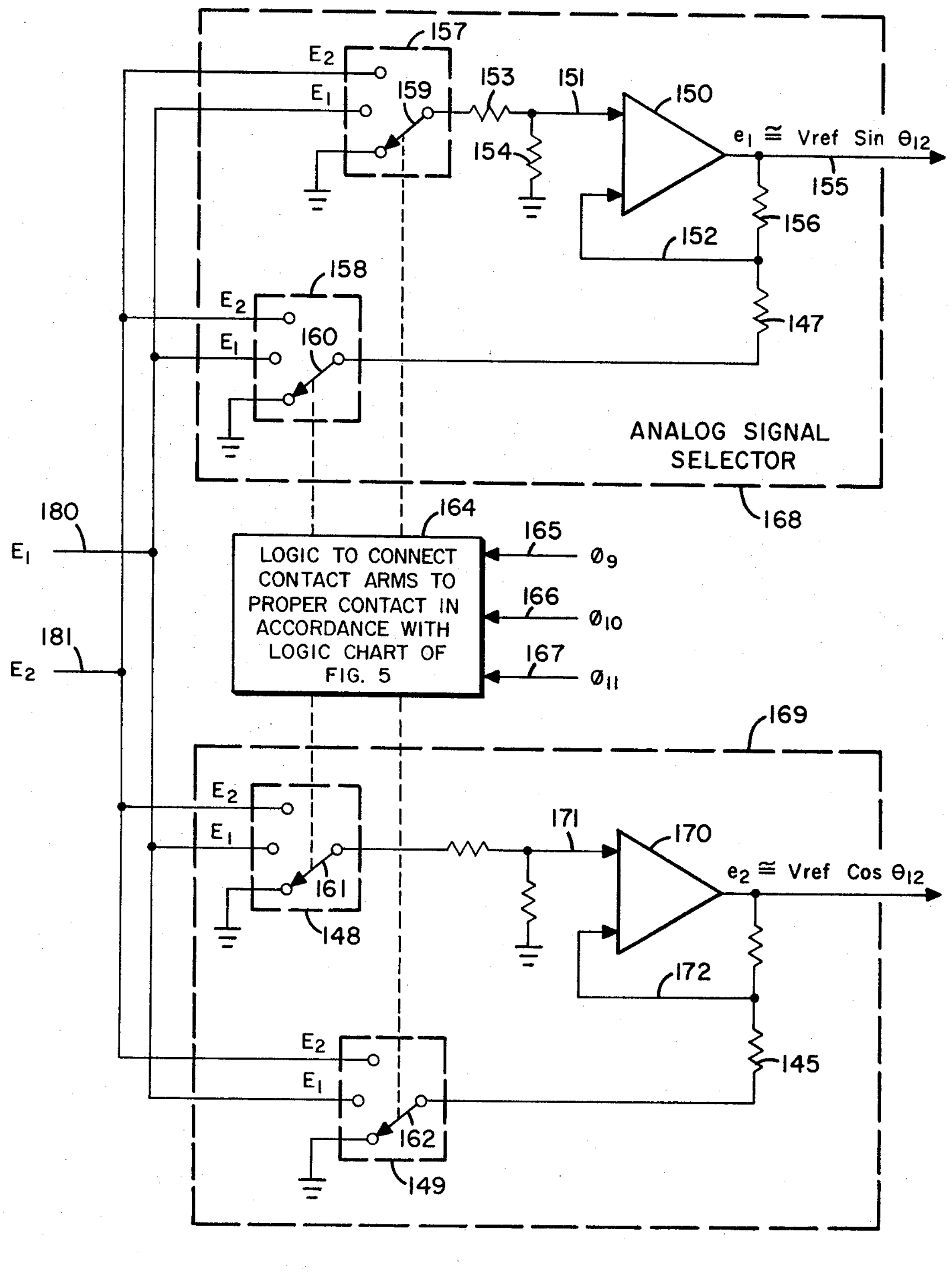
FIG. 8 is a combined logic and schematic diagram for implementing the chart of FIG. 5.

To implement the logic of the chart of FIG. 5 it is necessary that structure be provided which will respond to the three bits $0_9$, $0_{10}$ and $0_{11}$ to gate the outputs $E_1$ and $E_2$ into the proper combining circuit to procuce the output signals $e_1$ and $e_2$. Reference is made to FIG. 8 which shows a basic arrangement whereby such gating of the output signals $E_1$ and $E_2$ is effected to produce the sine and cosine functions $e_1$ and $e_2$.

The heart of the analog signal selector of FIG. 8 is comprised of the two differential amplifier circuits within the dotted blocks 168 and 169 and a logic means 164 which functions to gate the outputs $E_1$ and $E_2$ to said differential amplifier circuits 168 and 169 in accordance with the table of FIG. 5 and in the manner described as follows.

The two circuits 168 and 169 are identical with each other except that the gating switches 157 and 148 in the two circuits 168 and 169 are operated differently by the logic 164 in the manner called for in the table of FIG. 5. For purposes of discussion, therefore, it is only necessary to describe the operation of one of the circuits 168 or 169.

Consider the function of circuit 168 within the block 168. There is provided differential amplifier 150 having two input terminals 151 and 152. The output terminal of the differential amplifier 150 is connected to the arm 160 of switch 158 through a voltage divider network consisting of resistors 156 and 147 connected in series arrangement, with the junction therebetween connected to the input 152 of amplifier 150. Connected in such a manner the differential amplifier will operate so that the potential of input 152 will always attempt to become equal to the potential of the other input terminal 151. Thus if the potential of input terminal 151 is ground and a positive voltage $E_1$ or $E_2$ is supplied to the arm 160 of switch 158, the output of differential amplifier 150 will become negative so that the junction between resistors 147 and 156 will be at ground potential. It can thus be seen that if the switch 158 is activated so that either of the signals $E_1$ or $E_2$, both of which are positive, is supplied to the input terminal 152, the output of differential amplifier 150 will be a negative value. In fact the values of the resistors 147 and 156, as well as the other resistors of the circuit 168, are chosen so that the differential amplifier 150 will invert the applied voltage $E_1$ or $E_2$ with unity gain. Thus the differential amplifier acts as an inverter to the signals $E_2$ or $E_1$ when supplied to the input 152 through resistor 147.

On the other hand if either the signal $E_2$ or $E_1$ is supplied to the arm 159 of switch 157 and then to the input 151 through input resistor 153, the output of differential amplifier 150 will be positive, assuming that armature 160 is grounded. The foregoing is true since the output terminal 155 of differential amplifier 150 must be positive in order for the input 152 to become positive and equal to the positive potential supplied to the input 151. The resistors of the network within block 168 are selected so that differential amplifier 150 has a unity gain for the signals E2 and E1 supplied to arm 159 of switch 157.

It is to be understood that one of the arms 159 or 160 must always be grounded in order for the circuit to function properly. Thus for example, if the logic of network 164 requires a positive $E_1$ to appear at the output 155 of differential amplifier 150 in order to construct a given octant from $E_1$ or $E_2$ then the arm 159 will be connected to the $E_1$ or the $E_2$ input within switch 157 and the arm 160 within switch 158 must be grounded. Conversely when a value of $E_1$ or $E_2$ is being supplied to the arm 160 of switch 158, the arm 159 of switch 157 must be grounded.

It is to be noted that while in the embodiment of the invention being described herein the differential amplifier 150 and its associated circuitry are selected so that the gain of the circuit is either a positive or a negative unity, gains other than unity can be employed. The only important restriction is that whatever gain is selected it should be the same for both positive and negative outputs of the circuits 168 and 169.

The switches 158 and 157 are operated under control of the logic block 164, which in turn is controlled by the bits $0_9$, $0_{10}$ and $0_{11}$ from data word $\theta_{12}$, and supplied thereto via input leads 165, 166 and 167, which correspond to lead 9 of FIG. 1. Specifically the logic within block 164 responds to the its $0_9$, 10 and $0_{11}$ to operate switches 157 and 158 in accordance with the table of FIG. 5 so that the proper positive or negative values of $E_1$ or $E_2$ are produced at the output of differential amplifier 150 for each quadrant called for by $\theta_{12}$.

The specific logic employed in block 164 is not described in detail herein since it is deemed to be a matter of design well within the capability of one skilled in the art.

The circuit within the block 169 functions much the same as the circuit within the block 168 except that the switches 148 and 149 are operated in accordance with the table of FIG. 5 to produce the cosine function output signal $e_2$.

It is to be understood that the form of the invention shown and described herein is but one preferred embodiment thereof, and that various changes may be made to the type logic employed and the parameters employed, such as the factors $A$, $B$, and $SF$, without departing from the spirit or scope of the invention.

What is claimed is:

1. A digital-to-analog converter for converting a digital word $\theta_{12}$, which digitally represents an angular displacement over an angular range of from 0° to 360°, to first and second analog voltages $e_1$ and $e_2$, whose amplitudes are substantially proportional to the functions of sine $\theta_{12}$ and cosine $\theta_{12}$ respectively, and comprising:

storage means responsive to $\theta_{12}$ as the count thereof progresses through each 45° octant from 0° to 360°, to store a binary word count $\theta_9$, the count of which begins at zero at the beginning of each odd 45° octant and increases linearly to a maximum count at the end of each odd 45° octant, and the count of which begins at a maximum count at the beginning of each even 45° octant and decreases linearly to zero at the end of each even 45° octant;

a multi-stage attenuation network having an input terminal and an output terminal and constructed to have any stage or combination of stages thereof connected between said input and output terminals, in response to the contents of the binary word $\theta_9$ supplied thereto, to produce a transconductance between said input and output terminals which varies linearly with the value of the binary word $\theta_9$;

means for supplying an input voltage $V_{SF}$ to said input terminal of said multi-stage attenuation network;

a second attenuation means connected in series with said multi-stage attenuation means and constructed to modify said input voltage $V_{SF}$ by an attenuation factor $A$;

said second attenuation means being responsive to $\theta_9$ over a plurality of discrete and contiguous angular segments of each of said 45° octants to vary the value of factor $A$ in accordance with the said specific angular segments indicated by $\theta_9$, and with said values of $A$ being selected to modify the output of said multi-stage attenuation means to produce a first signal $E_1$ which alternately and contiguously approximates portions of a sine function over the 0° to 45° range and the mirror image thereof which occurs over the 135° to 180° range;

a third attenuation means connected in series arrangement with said multi-stage attenuation means and said second attenuation means, and constructed to modify the signal $E_1$ by an attenuation factor $B$;

said third attenuation means being responsive to $\theta_9$ over said plurality of discrete and contiguous angular segments of each 45° octant to vary the value of factor $B$ in accordance with the specific angular segments indicated by $\theta_9$, and with said values of $B$ being selected to modify $E_1$ to produce a signal $E_2$, which, when subtracted from $V_{SF}$, alternately and contiguously approximates a cosine function over the 0° to 45° range and the mirror image thereof, which occurs over the 135° to 180° range;

and selecting means, including inverting means, responsive to $\theta_{12}$ to select the proper forms and polarity of $E_1$ and $E_2$ during each octant to construct $e_1$ and $e_2$ for any value of $\theta_{12}$.

2. A digital-to-analog converter in accordance with claim 1 comprising;

reference voltage source means for providing a reference voltage $V_{ref}$; fourth attenuating means constructed and connected to attenuate said reference voltage $V_{ref}$ by an attenuation factor $SF$ to produce said voltage $V_{SF}$;

said fourth attenuation means being responsive to $\theta_9$ over said plurality of discrete and angular segments of each of said octants to vary the value of factor $SF$ in accordance with the specific angular segments represented by $\theta_9$, and with the values of $SF$ selected to modify $V_{ref}$ to satisfy the expression;

$$(E_1)^2+(E_2)^2 \cong K$$

for any given value of $\theta_9$ and where $K$ is a constant.

3. A digital-to-analog converter for converting a digital word $\theta_{12}$, whose value is linearly proportional to angular displacement from 0° to 360°, into sine and cosine function analog voltages $e_1$ and $e_2$, respectively, and comprising;

first logic means responsive to $\theta_{12}$ to linearly modulate an applied voltage $V_{SF}$ from a modulation index of 100 percent to a modulation index of 0 percent over every odd octant of 45° which is represented by $\theta_{12}$, to produce an output voltage $V_L$;

first attenuation means responsive to $\theta_{12}$ to attenuate predetermined and contiguous segments of each octant of $V_L$ by a factor $A$, where said segments for each octant are measured from the nearest quadrant markers of said 0° to 360° angular displacement, and where $A$ varies in accordance with the particular segment being attenuated to produce an output voltage $E_1$, which output voltage alternately approximates a sine function over a 0° – 45° range during each even octant of $\theta_{12}$ and a sine function over a 135° – 180° range during each even octant of $\theta_{12}$;

second attenuation means responsive to $\theta_{12}$ to attenuate predetermined and contiguous segments of each octant of $E_1$ by a factor $B$, where said segments for each octant are measured from the nearest quadrant markers of said 0° to 360° angular displacement, and where $B$ varies in accordance with the particular segment being attenuated to produce an output voltage BE1 which satisfies the following expression;

$$E_2=V_{ref}-BE_1$$

where $E_2$ is a voltage which alternately approximates a cosine function over a 0° – 45° range during each odd octant of $\theta_{12}$, and which approximates a cosine function over a 135° – 180° range during each even octant of $\theta_{12}$; and second logic means comprising selecting and inverting means for inverting $E_1$ and $E_2$ and constructed to respond to $\theta_{12}$ to select the inverted or non-inverted form of $E_1$ and $E_2$ to construct $e_1$ and $e_2$ for the particular angular displacement represented by $\theta_{12}$.

4. A digital-to-analog converter in accordance with claim 3 comprising;

reference voltage source means for providing a reference voltage $V_{ref}$;

fourth attenuating means constructed and connected to attenuate said reference voltage $V_{ref}$ by an attenuation factor $SF$ to produce said applied voltage $V_{SF}$;

said fourth attenuation means being responsive to $\theta_{12}$ over said predetermined and contiguous segments of each octant to vary the value of factor $SF$ in accordance with the specific angular segments represented by $\theta_{12}$, with the values of $SF$ selected to modify $V_{ref}$ to satisfy the expression;

$$(E_1)^2+(E_2)^2=K$$

for any value of $\theta_{12}$ and where $K$ is a constant.

5. A digital-to-analog converter for converting a digital word $\theta_{12}$, whose value is linearly proportional to angular displacement from 0° to 360° into sine and cosine function analog voltages $e_1$ and $e_2$, respectively and comprising;

a reference voltage source $V_{ref}$ of constant amplitude;

first logic means comprising first attenuation means and responsive to $\theta_{12}$ to identify each of the eight octants of said 0° to 360° range and to linearly attenuate $V_{ref}$ by different and predetermined attenuation factors over predetermined and contiguous segments of each even octant to approximate a sine function analog voltage $E_{43}$ over the 135° to 180° range;

second logic means responsive to the identification of each octant by $\theta_{12}$ and to $E_{40}$ and $E_{43}$ to linearly attenuate $V_{ref}$ by different and predetermined attenuation factors over predetermined and contiguous segments of each odd octant to approximate a cosine function analog voltage $E_{41}$ over the 0° to 45° range, and to linearly attenuate $V_{ref}$ by different and predetermined attenuation factors over predetermined and contiguous segments of each even octant to approximate a cosine function analog voltage $E_{42}$ over the 135° to 180° range; and third logic means comprising inverting means and constructed to respond to $\theta_{12}$ to select a pair of the voltages of voltages $E_{40}$, $E_{41}$, $E_{42}$ and $E_{43}$, in accordance with the octant defined by $\theta_{12}$, to approximate the sine and cosine function voltages $e_1$ and $e_2$ corresponding to the angular displacement represented by $\theta_{12}$.

6. The method of converting a digital word $\theta_{12}$, whose value is linearly proportional to angular displacement from 0° to 360°, into sine and cosine function analog voltages $e_1$ and $e_2$, respectively, and comprising the steps of;

linearly modulating a reference voltage $V_{ref}$ from a modulation index of 100 percent to a modulation index of 0 percent over every odd octant of 45° represented by $\theta_{12}$ and from a modulation index of 0 percent to a modulation index of 100 percent over every even octant represented by $\theta_{12}$, to produce an output voltage $V_L$;

attenuating predetermined and contiguous segments of each octant of $V_L$ by a factor $A$, where said segments for each octant are measured from the quadrant markers of the 0° to 360° angular displacement, and where $A$ varies in accordance with the particular segment being attenuated to produce an output voltage $E_1$, which output voltage alternately approximates a sine function over a 0°–45° range during each even octant and which approximates a sine function over the 135° – 180° range during each odd octant;

attenuating predetermined and contiguous segments of each octant of $E_1$ by a factor $B$, where said segments for each octant are always measured from the quadrant markers of said 0° to 360° angular displacement, and where $B$ varies in accordance with the particular segment being attenuated to produce an output voltage $BE_1$ which satisfies the following expression;

$$E_2=V-BE_1$$

where $E_2$ is a voltage which alternately approximates a cosine function over a 0° – 45° range during each even octant, and which approximates a cosine function over the 135° – 180° range over each odd octant;

forming inversions of each of said voltages $E_1$ and $E_2$; and selecting the proper forms of $E_1$ and $E_2$ during each octant of said 0° – 360° range to construct $e_1$ and $e_2$ for the particular angular displacement represented by $\theta_{12}$.

7. The method of claim 6 comprising the further step of attenuating the applied voltage $V_{ref}$ to produce the following relationship between $E_1$ and $E_2$;

$$(E_1)^2+(E_2)^2\cong K$$

for any angle represented by $\theta_{12}$ and where $K$ is a constant.

8. The method of converting a digital word $\theta_{12}$, whose value is linearly proportional to angular displacement from 0° to 360°, into sine and cosine function analog voltages $e_1$ and $e_2$, respectively, and comprising the steps of;

modulating an applied voltage $V_{SF}$ linearly from 100 percent modulation to 0 percent modulating during each odd quadrant of $\theta_{12}$ over its 0° –360° range to produce an output voltage $E_{40}$, and from 0 percent modulation to 100 percent modulation during each even octant of $\theta_{12}$ over its 0° – 360° range to produce an output voltage $E_{43}$;

attenuating said linear signals $E_{40}$ and $E_{43}$ to approximate respectively, a sine function in the angular range of from 0° to 45° in each odd octant of $\theta_{12}$, and a sine function in the angular range of from 135° to 180° in each even octant of $\theta_{12}$ ;

attenuating $E_{40}$ to approximate the function ( 1-cosine $\theta_9$ ) in each odd octant, where $\theta_9$ has an angular range of from 0° to 45°, to produce a voltage $E_{41}$;

attenuating $E_{43}$ to approximate the function (1 − cosine $\theta_9$) in each even quadrant, where $\theta_9$ has an angular range of from 135° to 180° to produce a voltage $E_{42}$;

producing an inverted form of each of voltages $E_{40}$, $E_{41}$, $E_{42}$ and $E_{43}$; and selecting and assembling the inverted and non-inverted signals $E_{40}$, $E_{41}$, $E_{42}$ and $E_{43}$ in accordance with the angular displacement represented by $\theta_{12}$ to produce the sine and cosine function analog voltages $e_1$ and $e_2$.

9. The method of claim 8 comprising the further step of attenuating the applied voltage $V_{SF}$ to produce the following relationships;

$$(E_{40})^2+(E_{41})^2\cong K$$

$$(E_1)^2+(E_2)^2\cong K$$

$$(E_{43})^2+(E_{42})^2\cong K$$

for any angle represented by $\theta_{12}$ and where $K$ is a constant.

* * * * *

UNITED STATES PATENT OFFICE

CERTIFICATE OF CORRECTION

Patent No. 3,675,234 Dated July 4, 1972

Inventor(s) Louis C. Metz

It is certified that error appears in the above-identified patent and that said Letters Patent are hereby corrected as shown below:

Column 12, line 72, "BE1" should read -- $BE_1$ -- .

Column 14, line 35, "modulating" should read -- modulation -- .

Signed and sealed this 12th day of December 1972.

(SEAL)
Attest:

EDWARD M.FLETCHER,JR.
Attesting Officer

ROBERT GOTTSCHALK
Commissioner of Patents